US012806989B2

(12) United States Patent
Bewermeyer et al.

(10) Patent No.: US 12,806,989 B2
(45) Date of Patent: Nov. 24, 2026

(54) COOLANT TANK, COOLANT CONDUCTING SYSTEM, AND MOTOR VEHICLE

(71) Applicant: HELLA GmbH & Co. KGaA, Lippstadt (DE)

(72) Inventors: Frank Bewermeyer, Paderborn (DE); Horst Feldkamp, Lippstadt (DE); Benjamin Grothe, Wickede (DE); Dominik Niess, Selm (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 18/635,675

(22) Filed: Apr. 15, 2024

(65) Prior Publication Data

US 2024/0253451 A1 Aug. 1, 2024

Related U.S. Application Data

(63) Continuation of application No. PCT/EP2022/073197, filed on Aug. 19, 2022.

(30) Foreign Application Priority Data

Oct. 15, 2021 (DE) ..................... 10 2021 126 827.3

(51) Int. Cl.
*B60K 11/02* (2006.01)
*F01P 11/02* (2006.01)
(Continued)

(52) U.S. Cl.
CPC ............. *B60K 11/02* (2013.01); *F01P 11/029* (2013.01); *F01P 2025/70* (2013.01); *G01F 23/268* (2013.01); *G01N 27/226* (2013.01)

(58) Field of Classification Search
CPC .................. F01P 11/029; F01P 2025/70; F01P 11/02–0247; F01P 2011/0219–0271;
(Continued)

(56) References Cited

U.S. PATENT DOCUMENTS

| | | | | |
|---|---|---|---|---|
| 1,516,614 A * | 11/1924 | Maclellan | F01P 11/18 | 73/306 |
| 2,470,066 A * | 5/1949 | Calabrese | G01F 23/242 | 174/50.56 |

(Continued)

FOREIGN PATENT DOCUMENTS

| | | | |
|---|---|---|---|
| EP | 2067953 B1 | 10/2014 |
| KR | 20050038047 A | 4/2005 |
| WO | WO2017223232 A2 | 12/2017 |

OTHER PUBLICATIONS

International Search Report dated Dec. 21, 2022 in corresponding application PCT/EP2022/073197.

*Primary Examiner* — Craig J Price

(74) *Attorney, Agent, or Firm* — Muncy, Geissler, Olds & Lowe, P.C.

(57) ABSTRACT

A coolant tank for a coolant conducting system of a motor vehicle, comprising a tank housing with an outer wall and an interior which is arranged in the tank housing for storing a coolant for the coolant conducting system. The outer wall is designed as a first electronic housing part for a tank electronic device, wherein the outer wall is designed such that the outer wall together with a second electronic housing part for the tank electronic device, the second electronic housing part being designed as an electronic housing cover, surrounds the tank electronic device so as to seal off same from environmental influences, thereby directly or indirectly using a seal.

11 Claims, 6 Drawing Sheets

(51) Int. Cl.
*G01F 23/263* (2022.01)
*G01N 27/22* (2006.01)

(58) Field of Classification Search
CPC ........... F01P 11/14; F01P 11/18; B60K 11/02; B60K 15/061; G01F 23/242; G01F 23/26–268; Y10T 137/2531; Y10T 137/2534; Y10T 137/8342; F01M 11/0004; F01M 11/12; F01M 2011/0041; F16H 57/0443; F16H 57/045; F16H 57/0441; F16H 57/0449; G01N 27/226
USPC ..................... 137/558, 590; 200/61.2–61.21; 340/612–625; 116/227–229; 73/290 R–290 V, 304 R, 304 C, 431, 73/866.5; 361/284, 280, 282, 283; 250/577
See application file for complete search history.

(56) References Cited

U.S. PATENT DOCUMENTS 2,610,236 A * 9/1952 Smith ................... G01F 23/247 340/622
2,700,153 A * 1/1955 Huckabee ............. G01F 23/241 361/194
2,856,773 A * 10/1958 Gellos ................... G01F 23/268 73/304 C
3,262,032 A * 7/1966 Levine .................. G01F 23/268 29/25.42
3,433,072 A * 3/1969 Matias .................. G01F 23/268 73/304 R
3,534,352 A * 10/1970 Gallagher ............. G01F 23/241 340/450
3,553,666 A * 1/1971 Melone ............... G01F 23/2927 116/DIG. 5
3,653,364 A * 4/1972 Bogan .................... F02M 21/00 422/162
3,910,118 A * 10/1975 Schittek ................ G01F 23/242 73/304 R
3,939,470 A * 2/1976 Arai ........................ G01F 23/70 340/622
3,988,668 A * 10/1976 Bowers ................. G01F 23/268 73/304 C
3,995,169 A * 11/1976 Oddon ................ G01F 23/2927 385/12
4,000,650 A * 1/1977 Snyder ................ G01F 23/2962 367/901
4,025,846 A * 5/1977 Franz .................... G01F 23/268 73/304 C
4,056,978 A * 11/1977 Zimmermann ....... G01F 23/242 73/304 R
4,146,869 A * 3/1979 Snyder ................ G01F 23/2968 367/908
4,383,544 A * 5/1983 Vosper .................. F24H 15/246 122/504
4,449,405 A * 5/1984 Franz .................... G01F 23/263 73/304 C
4,461,342 A * 7/1984 Avrea ....................... F01P 11/02 165/104.32
4,532,799 A * 8/1985 O'Neill ................. G01F 23/246 340/622
4,542,718 A * 9/1985 Hurner .................... F02B 77/08 123/41.15
4,549,245 A * 10/1985 Fleckenstein ......... G01F 23/266 73/304 C
4,570,579 A * 2/1986 Hirano ..................... F01P 11/18 123/41.27
4,574,328 A * 3/1986 Maier ................... G01F 23/268 73/304 C
4,590,893 A * 5/1986 Hirano ..................... F01P 11/18 123/41.27
4,627,397 A * 12/1986 Hayashi .................. F01P 7/165 123/41.27
4,638,291 A * 1/1987 Puscasu ................ G01F 23/242 73/304 R
4,696,261 A * 9/1987 Hayashi ................ F01P 3/2285 73/309
4,745,895 A * 5/1988 Seilenbinder ......... G01F 23/242 123/196 S
4,806,847 A * 2/1989 Atherton ............... G01F 23/266 73/304 C
4,811,160 A * 3/1989 Fleckenstein ......... G01F 23/268 29/25.41
4,827,242 A * 5/1989 Blankenship .......... G01N 17/02 204/404
4,833,441 A * 5/1989 Okada ................... B60T 17/225 73/307
4,878,043 A * 10/1989 Heusquin ............. G01N 27/048 340/602
5,060,108 A * 10/1991 Baker ................... G01L 9/0072 361/283.4
5,065,139 A * 11/1991 Shefsky ............... G08B 21/182 340/618
5,097,703 A * 3/1992 Peter ..................... G01F 23/265 73/304 C
5,189,911 A * 3/1993 Ray ..................... G01F 23/2963 324/207.13
5,272,921 A * 12/1993 Foller ................... G01F 23/268 73/304 R
5,274,328 A * 12/1993 Begin .................... G01D 5/485 324/207.13
5,279,157 A * 1/1994 Mattis ................. G01F 23/2925 73/290 R
5,329,819 A * 7/1994 Park ...................... G01L 9/0075 73/706
5,531,111 A * 7/1996 Okamoto ................ G01F 17/00 73/290 V
5,535,625 A * 7/1996 Levy ................... G01F 23/2963 324/207.13
5,540,086 A * 7/1996 Park ................... G01N 33/2888 73/54.01
5,590,091 A * 12/1996 Gloden .................. G01D 5/485 324/207.13
5,627,523 A * 5/1997 Besprozvanny ........ G01F 23/72 73/304 R
5,640,880 A * 6/1997 Mulrooney ............. G01F 23/72 73/313
5,656,780 A * 8/1997 Park ...................... G01L 9/0075 361/283.4
5,669,263 A * 9/1997 Borchers ............... G01F 23/242 73/866.5
5,701,084 A * 12/1997 Borthwick, Jr. ...... G01F 23/268 73/304 C
5,723,870 A * 3/1998 Crowne .................. G01F 23/80 250/221
5,730,025 A * 3/1998 Getman .............. G01F 23/2965 367/908
5,736,855 A * 4/1998 Smith .................... G01B 17/00 324/207.13
5,929,754 A * 7/1999 Park ...................... G01F 23/263 73/304 C
5,994,907 A * 11/1999 Mulder ................. G01F 23/268 331/65
6,147,504 A * 11/2000 Schmidt ................ G01F 23/265 324/448
6,148,681 A * 11/2000 Gravel ................. H01R 13/527 73/866.5
6,237,411 B1 * 5/2001 Schimmel ............. G01F 23/243 338/68
6,247,442 B1 * 6/2001 Bedard ................ F02M 35/162 123/184.21
6,295,869 B1 * 10/2001 Delatte ................. G01F 23/268 73/304 C
6,297,733 B1 * 10/2001 Park ...................... G01F 23/266 340/451
6,351,132 B1 * 2/2002 Park ..................... G05D 11/138 324/665
6,363,785 B1 * 4/2002 Senghaas ................ G01F 23/74 73/DIG. 5

(56) References Cited

U.S. PATENT DOCUMENTS

| | | | | |
|---|---|---|---|---|
| 6,553,812 | B2 * | 4/2003 | Park | G01N 33/2888 73/54.01 |
| 6,583,631 | B2 * | 6/2003 | Park | G01R 27/2617 324/663 |
| 6,612,168 | B2 * | 9/2003 | Barr | G01F 23/2968 324/207.13 |
| 6,705,162 | B2 * | 3/2004 | Amoretti | G01F 23/242 73/304 C |
| 6,776,900 | B2 * | 8/2004 | Mazurek | B01D 17/0211 73/304 C |
| 6,938,478 | B2 * | 9/2005 | Arias | G01F 23/24 73/304 R |
| 6,983,654 | B2 * | 1/2006 | Balin | G01F 23/2962 73/290 V |
| 7,064,560 | B2 * | 6/2006 | Yamamoto | G01F 23/268 73/304 C |
| 7,109,512 | B2 * | 9/2006 | Wirthlin | G01F 23/2922 356/627 |
| 7,121,140 | B2 * | 10/2006 | Lo | G01F 23/68 73/290 R |
| 7,136,155 | B2 * | 11/2006 | Kong | G01N 21/643 356/70 |
| 7,259,383 | B2 * | 8/2007 | Wirthlin | G01F 23/2925 356/627 |
| 7,343,884 | B1 * | 3/2008 | Carney | F01P 11/029 123/41.31 |
| 7,345,472 | B2 * | 3/2008 | Barr | G01D 5/485 324/207.13 |
| 7,373,817 | B2 * | 5/2008 | Burdi | F04B 49/02 73/304 C |
| 7,406,865 | B2 * | 8/2008 | Klees | G01F 23/284 73/304 R |
| 7,552,839 | B2 * | 6/2009 | Padget | F01P 11/029 73/290 V |
| 7,586,749 | B2 * | 9/2009 | Wu | G01L 19/14 361/728 |
| 7,600,424 | B2 * | 10/2009 | Sasaki | G01F 23/266 73/304 C |
| 7,642,459 | B2 * | 1/2010 | Motoda | F02M 37/103 174/67 |
| 7,712,363 | B2 * | 5/2010 | Sasanuma | G01F 23/268 73/295 |
| 7,735,354 | B2 * | 6/2010 | Yamamoto | G01N 25/005 73/61.41 |
| 7,775,105 | B2 * | 8/2010 | Khadkikar | G01F 23/248 73/290 R |
| 7,902,838 | B2 * | 3/2011 | Stahlmann | G01F 23/24 324/453 |
| 7,959,863 | B2 * | 6/2011 | Yamamoto | G01F 23/268 422/68.1 |
| 7,963,164 | B2 * | 6/2011 | Ross, Jr. | G01F 23/265 73/304 C |
| 7,971,487 | B2 * | 7/2011 | Carlen | G01D 18/00 73/760 |
| 7,997,132 | B2 * | 8/2011 | Ross, Jr. | G01F 23/268 73/304 C |
| 8,091,579 | B2 * | 1/2012 | Sintes | G01F 23/2968 137/392 |
| 8,171,786 | B2 * | 5/2012 | Burris | G01N 29/032 73/309 |
| 8,272,264 | B2 * | 9/2012 | Luo | G01F 23/268 73/304 C |
| 8,754,374 | B1 * | 6/2014 | Hewitson | G01F 23/288 250/357.1 |
| 8,776,598 | B2 * | 7/2014 | Kaess | G01F 23/268 73/431 |
| 8,950,255 | B2 * | 2/2015 | Chang | G01F 23/248 73/304 C |
| 9,038,991 | B2 * | 5/2015 | Schroeder | B01F 35/2112 261/72.1 |
| 9,109,938 | B2 * | 8/2015 | Molinaro | G01F 23/244 |
| 9,234,783 | B2 * | 1/2016 | Oβwald | G01F 23/268 |
| 9,458,759 | B2 * | 10/2016 | Rollinger | F01P 7/14 |
| 9,541,442 | B2 * | 1/2017 | Feltgen | G01F 25/24 |
| 9,587,866 | B2 * | 3/2017 | Elstroem | G01N 27/22 |
| 9,655,286 | B2 * | 5/2017 | Krug, Jr. | F24F 11/38 |
| 9,719,409 | B2 * | 8/2017 | Rollinger | F01P 11/18 |
| 9,726,069 | B2 * | 8/2017 | Styron | F01P 11/029 |
| 9,821,651 | B2 * | 11/2017 | Kakehi | F02M 37/10 |
| 9,983,046 | B2 | 5/2018 | Gaudiau et al. | |
| 10,072,960 | B2 * | 9/2018 | Muzzo | G01F 23/268 |
| 10,359,307 | B2 * | 7/2019 | Ichimura | G01F 23/22 |
| 10,365,146 | B2 * | 7/2019 | Rollinger | G01F 23/296 |
| 10,444,054 | B2 * | 10/2019 | Harper | G01F 23/268 |
| 10,451,168 | B2 * | 10/2019 | Ture | F01M 11/10 |
| 10,508,947 | B2 * | 12/2019 | Roderes | G01F 23/284 |
| 10,513,967 | B2 * | 12/2019 | Rollinger | F01P 7/16 |
| 10,537,671 | B2 * | 1/2020 | Wilt | A61M 1/1666 |
| 10,648,397 | B2 * | 5/2020 | Rollinger | G01F 23/804 |
| 10,665,908 | B2 | 5/2020 | Krull et al. | |
| 10,851,746 | B2 * | 12/2020 | Kim | B01D 46/4218 |
| 10,895,561 | B2 * | 1/2021 | Wang | G01N 33/0027 |
| 10,935,411 | B2 * | 3/2021 | Zorzetto | G01F 23/268 |
| 11,022,474 | B2 * | 6/2021 | Kaibel | G01F 23/263 |
| 11,067,426 | B2 * | 7/2021 | Gaudiau | G01F 23/268 |
| 11,079,267 | B2 * | 8/2021 | Gill | G01F 23/04 |
| 11,193,808 | B2 * | 12/2021 | Zorzetto | H05K 3/28 |
| 11,231,308 | B2 * | 1/2022 | Zorzetto | G01F 23/266 |
| 11,305,638 | B2 * | 4/2022 | Allan | F01P 11/029 |
| 11,306,630 | B2 * | 4/2022 | Muramoto | F01P 11/18 |
| 11,346,699 | B2 * | 5/2022 | Roderes | G01F 23/268 |
| 11,499,859 | B2 * | 11/2022 | Zorzetto | G01F 23/265 |
| 11,566,932 | B2 * | 1/2023 | Wiersma | G01F 23/2962 |
| 11,614,026 | B2 * | 3/2023 | Dillon, II | H01H 36/0033 200/302.1 |
| 11,933,214 | B2 * | 3/2024 | Allan | B60K 11/02 |
| 11,946,792 | B2 * | 4/2024 | Hoyda | G01F 23/804 |
| 12,000,324 | B2 * | 6/2024 | Bender | B60R 13/083 |
| 12,018,970 | B2 * | 6/2024 | McKay | E21B 47/113 |
| 12,110,885 | B2 * | 10/2024 | Rhyner | F04B 51/00 |
| 12,140,069 | B2 * | 11/2024 | Lee | F01P 7/165 |
| 12,304,273 | B2 * | 5/2025 | Lin | B01D 19/0042 |
| 12,312,993 | B2 * | 5/2025 | Olsen | F01P 7/165 |
| 2002/0011271 | A1 * | 1/2002 | Taurel | B60K 15/03177 137/565.24 |
| 2004/0027137 | A1 * | 2/2004 | Sherrard | G01F 23/284 324/644 |
| 2005/0268715 | A1 * | 12/2005 | Sabatino | H05K 1/189 73/313 |
| 2005/0284217 | A1 * | 12/2005 | Miyagawa | G01F 23/2962 73/290 V |
| 2006/0283244 | A1 * | 12/2006 | Schonlau | G01F 23/22 73/291 |
| 2007/0193345 | A1 * | 8/2007 | Yamamoto | F01N 3/20 73/61.41 |
| 2008/0229819 | A1 * | 9/2008 | Mayleben | H01G 5/0132 29/25.42 |
| 2009/0140087 | A1 * | 6/2009 | Bonelli | G01F 23/266 241/76 |
| 2011/0226359 | A1 * | 9/2011 | Taylor | G01F 23/30 296/193.11 |
| 2012/0073366 | A1 * | 3/2012 | Molinaro | G01F 25/20 73/304 R |
| 2014/0102384 | A1 * | 4/2014 | Engle | F01P 11/16 73/866.5 |
| 2015/0308326 | A1 * | 10/2015 | Davies | F01P 11/029 137/2 |
| 2016/0109279 | A1 * | 4/2016 | O'Neill | G01F 23/36 73/313 |
| 2016/0186648 | A1 * | 6/2016 | Rollinger | G01F 23/0046 73/290 R |
| 2017/0227393 | A1 * | 8/2017 | Sanarico | G01F 23/246 |
| 2017/0350307 | A1 * | 12/2017 | Kerkewitz | F01P 11/029 |
| 2018/0274965 | A1 | 9/2018 | Kerkewitz et al. | |
| 2020/0072651 | A1 * | 3/2020 | Tadas | G01F 23/268 |
| 2021/0379323 | A1 * | 12/2021 | Huang | G16H 20/13 |
| 2022/0316936 | A1 * | 10/2022 | Schwager | G01K 13/00 |
| 2024/0360945 | A1 * | 10/2024 | Lin | F01P 11/029 |

(56) References Cited

U.S. PATENT DOCUMENTS

| | | | | |
|---|---|---|---|---|
| 2024/0426237 | A1* | 12/2024 | Bergman | F01M 11/12 |
| 2025/0223919 | A1* | 7/2025 | Jeong | F01P 11/029 |

* cited by examiner

COOLANT TANK, COOLANT CONDUCTING SYSTEM, AND MOTOR VEHICLE

This nonprovisional application is a continuation of International Application No. PCT/EP2022/073197, which was filed on Aug. 19, 2022, and which claims priority to German Patent Application No. 10 2021 126 827.3, which was filed in Germany on Oct. 15, 2021, and which are both herein incorporated by reference.

BACKGROUND OF THE INVENTION

Field of the Invention

The present invention relates to a coolant tank for a coolant conducting system, a coolant conducting system, and a motor vehicle having a coolant conducting system.

Description of the Background Art

Coolant tanks, coolant conducting systems, and motor vehicles are already known from the prior art in numerous embodiments. The known coolant conducting systems for motor vehicles comprise multiple coolant circuits having a coolant tank with an interior space that is configured to store a coolant, multiple coolant passages that are configured to deliver the coolant from the coolant tank into at least one coolant circuit, and tank electronics that are configured to control the relevant coolant conducting system, wherein the tank electronics are sealed against environmental influences by means of a first electronics housing part and by means of a second electronics housing part, designed as an electronics housing cover, of an electronics housing. The coolant tanks known therefrom accordingly have a tank housing with an outer wall and an interior space that is arranged in the tank housing for storing a coolant for the coolant conducting system.

Motor vehicles with electric drives have the disadvantage compared to vehicles with internal combustion engines, for example, that a dissipation of the heat generated by the motor places more complex demands on a cooling system of the motor vehicles. Whereas only the engine heat must be carried away by a coolant circuit in the case of an internal combustion engine, which requires just a single coolant circuit even in the case of additional utilization of the engine heat for heating the passenger compartment of the vehicle, electric-powered vehicles usually require multiple separate coolant circuits. On the one hand, excess motor heat must be carried away, and on the other hand, a vehicle battery and the passenger compartment must be either cooled or heated, depending on the ambient temperature of the vehicle, in order to ensure optimal function of the electric-powered motor vehicle. Furthermore, in the case of low ambient temperature, for example, the vehicle battery must be heated even when no excess motor heat needs to be carried away or when the vehicle has been started but a motor of the vehicle is not, or at least not yet, producing any appreciable waste heat. In addition to a cooling device for the coolant of a coolant circuit, a heating device that raises a coolant temperature as needed is therefore also generally required. Unlike in vehicles with internal combustion engines, multiple separate coolant circuits are thus usually necessary in order to be able to efficiently regulate the motor temperature, the battery temperature, and the passenger compartment temperature of a motor vehicle. These coolant circuits must be supplied and regulated by coolant conducting systems for multiple coolant circuits.

An example for supplying and regulating multiple coolant circuits for an electric vehicle is disclosed by, for example, the document WO 2017 223 232 A2, which corresponds to US 2017/0373359. The document shows a coolant tank, for example for an electric vehicle, that has multiple components for creating multiple coolant circuits arranged in its interior. The positioning of the components, for example the lines for the individual coolant circuits, in the interior of the tank itself is space-efficient, but is associated with considerable additional effort for making these components accessible in the event of damage or necessary maintenance thereof. In addition, a multiplicity of thermal bridges between all components of the multiple coolant circuits is created by the shifting of the device components into the interior of the coolant tank so that all of these interact with one another, and a regulation effort for the coolant circuits is increased. Moreover, the volume capacity is reduced by every device component shifted into the interior of the tank so that the tank must be enlarged to maintain a specific coolant volume capacity. Moreover, a tank with internal device components is considerably more difficult to manufacture than a tank that is configured solely to hold and store coolant.

This is the starting point for the present invention.

SUMMARY OF THE INVENTION

It is therefore an object of the present invention to improve a coolant tank, a coolant conducting system, and a motor vehicle having a coolant conducting system.

This object is attained by a coolant tank, which is characterized in that the outer wall is designed as a first electronics housing part for tank electronics, wherein the outer wall is designed such that the outer wall, in conjunction with a second electronics housing part, which is designed as an electronics housing cover, for the tank electronics, encloses the tank electronics so as to be sealed against environmental influences, directly or indirectly with the use of a seal. Furthermore, this object is attained by a coolant conducting system and a motor vehicle.

An important advantage of the invention is that a coolant tank, a coolant conducting system, and a motor vehicle having a coolant conducting system are improved, in particular. On account of the design according to the invention of the coolant tank, the coolant conducting system, and the motor vehicle, it is possible to maximize the efficiency of the coolant conducting system with respect to space, materials, manufacturing, and arrangement. For example, it is possible to substantially reduce the number of component parts, the assembly and disassembly effort, the space requirement for the coolant conducting system according to the invention, and finally also the costs and overall weight of the coolant conducting system according to the invention by means of the coolant tank according to the invention. In principle, the coolant tank can be freely chosen within broad suitable limits in terms of type, mode of operation, material, and dimensioning.

An advantageous improvement of the coolant tank according to the invention provides that the tank housing can be multipart in design and has a tank cover, wherein the outer wall designed as the first electronics housing part is designed as the tank cover of the tank housing. In this way, the arrangement of the second electronics housing part, which is designed as the electronics housing cover and interacts with the outer wall designed as the first electronics housing part, is optimized. For example, the accessibility of the electronics housing cover is simplified significantly as a result.

The outer wall designed as the first electronics housing part can be designed to be inclined, at least in a receptacle area for the tank electronics, in such a manner that liquid dripping onto the tank housing from above can run off the aforementioned receptacle area as a result of gravity. By this means, the protection against damage or destruction of the tank electronics arranged in the electronics housing is further improved in a manner that is especially simple in design and manufacturing terms.

The tank housing or, in the case of a multipart tank housing, all parts of the tank housing, can each be designed as a one-piece plastic part. In this way, production of the tank housing is simplified significantly.

The coolant conducting system according to the invention can also be freely chosen within broad suitable limits in terms of type, mode of operation, material, and dimensioning. See, for example, the comments in the introductory part of the specification in this regard.

The electronics housing cover can be designed in such a manner that the tank electronics arranged in the electronics housing can be connected in a signal-transmitting manner by means of at least one connector to a control unit of the motor vehicle that is at a higher level than the tank electronics and/or to at least one control valve of the coolant conducting system, preferably in such a manner that the electronics housing cover has at least one connector housing for the at least one connector. By this means, the electrical and/or electronic interface to a control unit, which is at a higher level than the tank electronics, of the motor vehicle equipped with the coolant conducting system according to the invention and/or to a remainder of the coolant conducting system according to the invention can be realized in a robust manner and in design terms. This applies especially to the preferred embodiment of this improvement.

The tank electronics arranged in the electronics housing have, in the interior space of the tank housing, at least one signal-transmitting connection that can be sealed with respect to the interior space of the tank housing, wherein this signal-transmitting connection connects the tank electronics in a signal-transmitting manner to at least one tank sensor of the coolant conducting system, preferably that the tank sensor is connected directly to the tank electronics in a signal-transmitting manner. In this way, the aforementioned tank electronics can additionally be used for processing and/or forwarding output signals of at least one tank sensor so that additional component parts for fulfilling this purpose can be dispensed with. The design of the present improvement according to the preferred embodiment is especially advantageous here. This is because additional component parts for transmitting the output signal of the respective tank sensor to the tank electronics are unnecessary in this case. Instead, the respective tank sensor is connected in a signal-transmitting manner directly, which is to say without additional component parts, to the tank electronics, for example a printed circuit board of the tank electronics. The at least one tank sensor can be designed in this case as a level sensor for detecting a fill level of the coolant in the interior space of the coolant tank, for example.

The tank electronics can be designed and configured in such a manner that all control tasks of the coolant conducting system can be performed entirely by means of these tank electronics as the sole tank electronics. By this means, the control of the coolant conducting system according to the invention is centralized in the aforementioned tank electronics so that the number of component parts and electrical interfaces can be reduced to a minimum. The installation space required for the coolant conducting system according to the invention and the weight of the coolant conducting system according to the invention are thus likewise minimized.

The tank electronics can be designed and configured in such a manner that a processing or preprocessing of signals present at the tank electronics can be performed by means of the tank electronics. In this way, the functionality of the aforementioned tank electronics is further improved so that, for example, output signals from a tank sensor that are initially present in analog form are digitized directly in the aforementioned tank electronics and can be forwarded as digital signals to a higher-level control unit of the motor vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
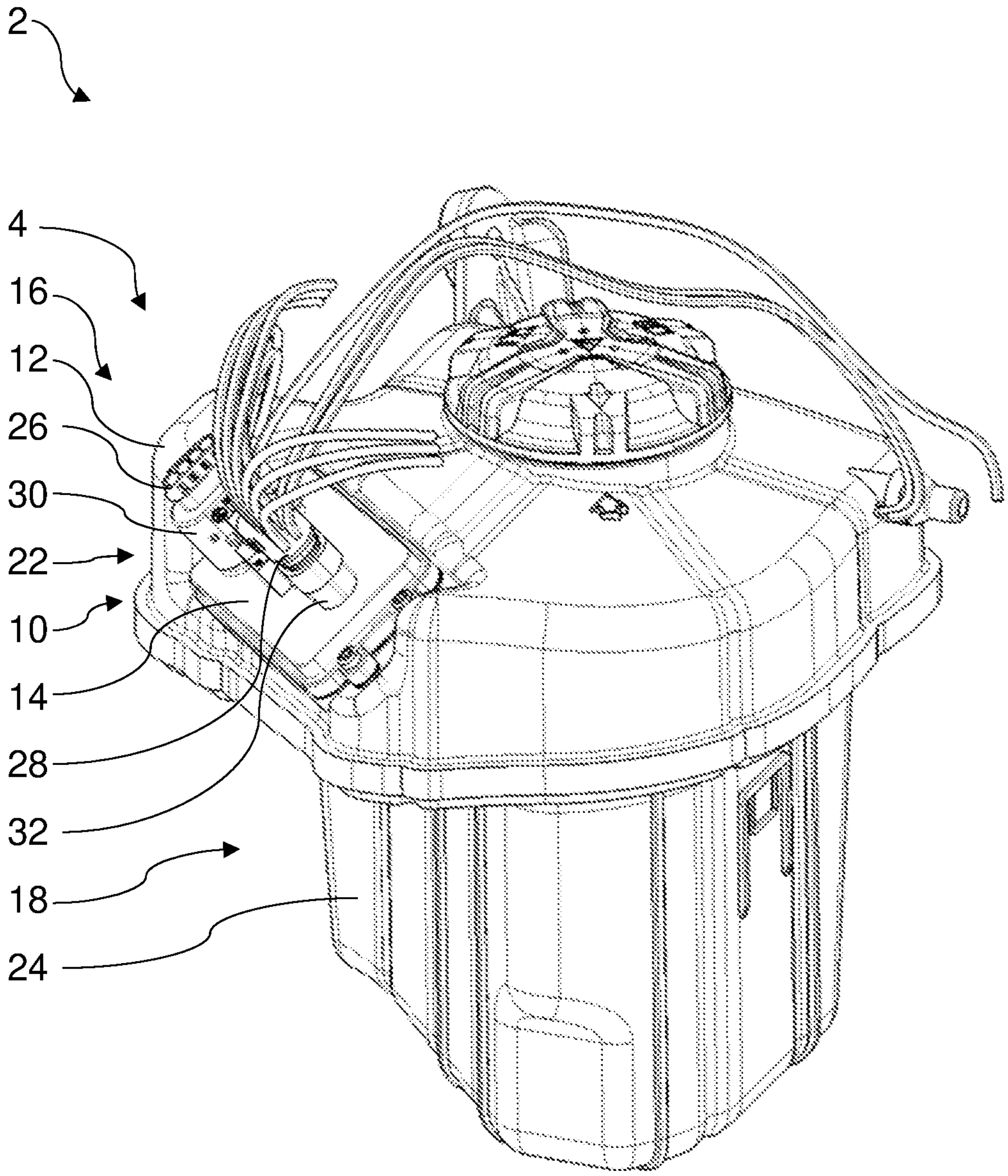
FIG. 1 shows an example of a coolant conducting system according to the invention of a motor vehicle according to the invention in a partial, perspective representation in the region of the coolant tank.
Figure 2:
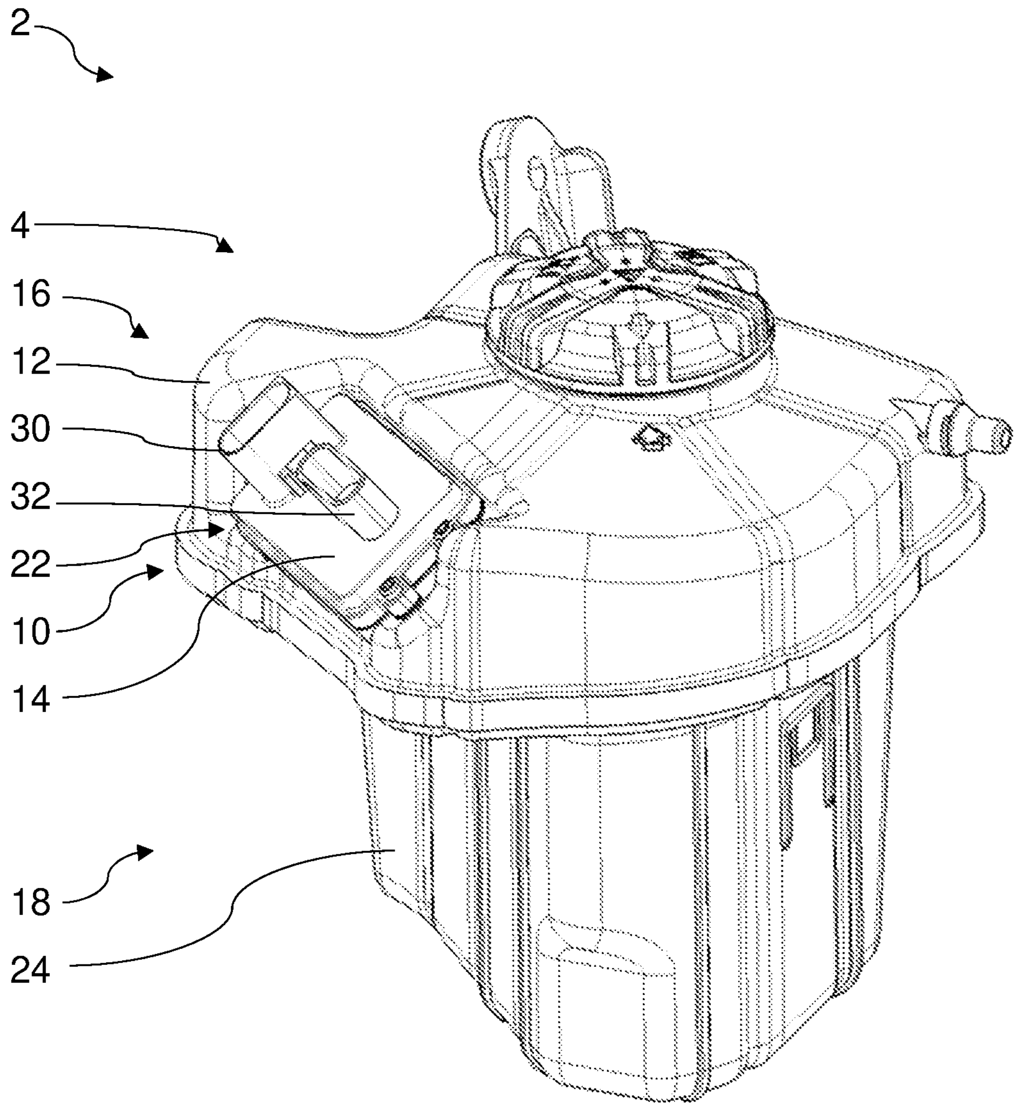
FIG. 2 shows the example in another partial, perspective representation in the region of the coolant tank.
Figure 3:
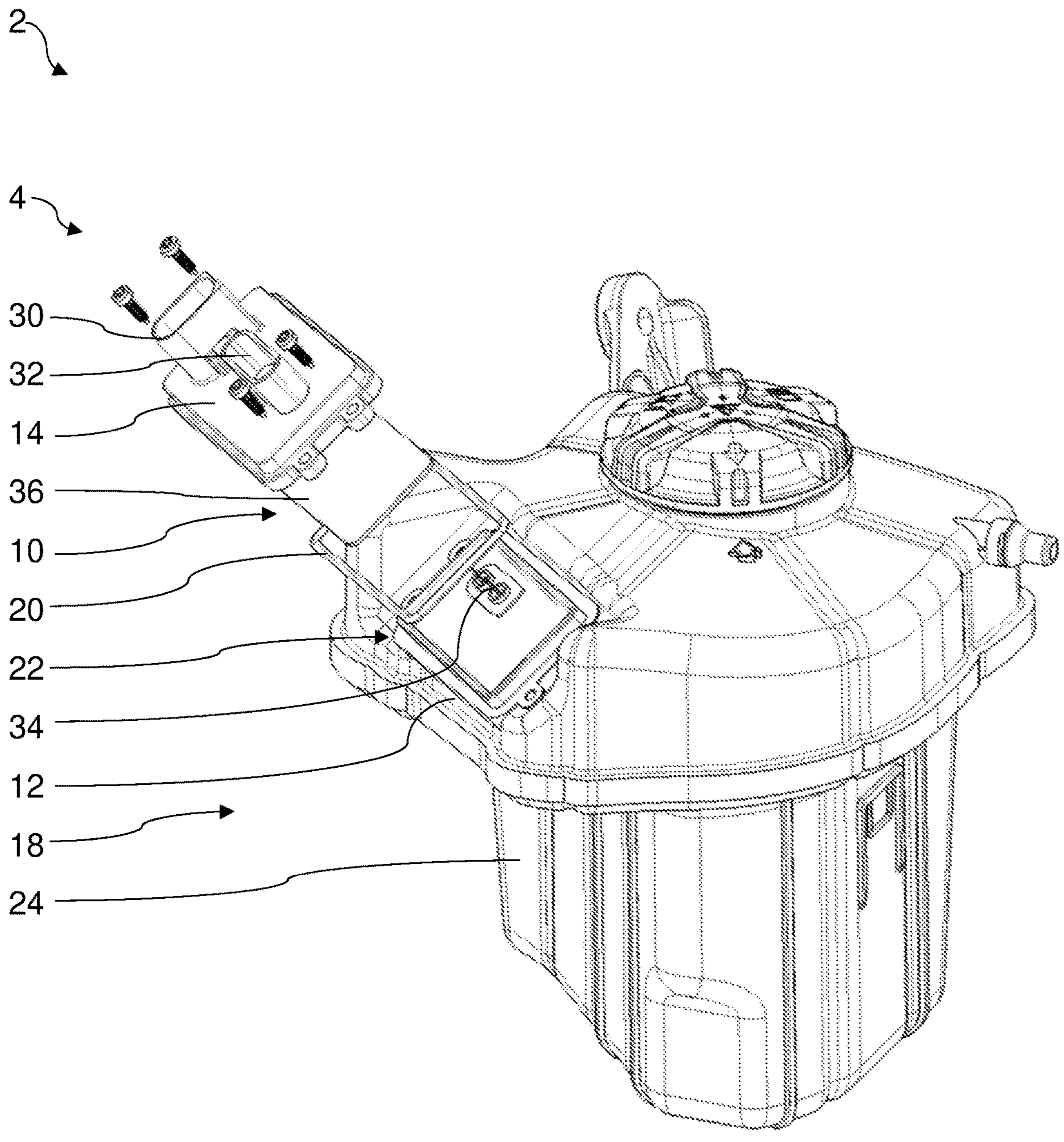
FIG. 3 shows the example from FIG. 2 with the electronics housing in an exploded view.
Figure 4:
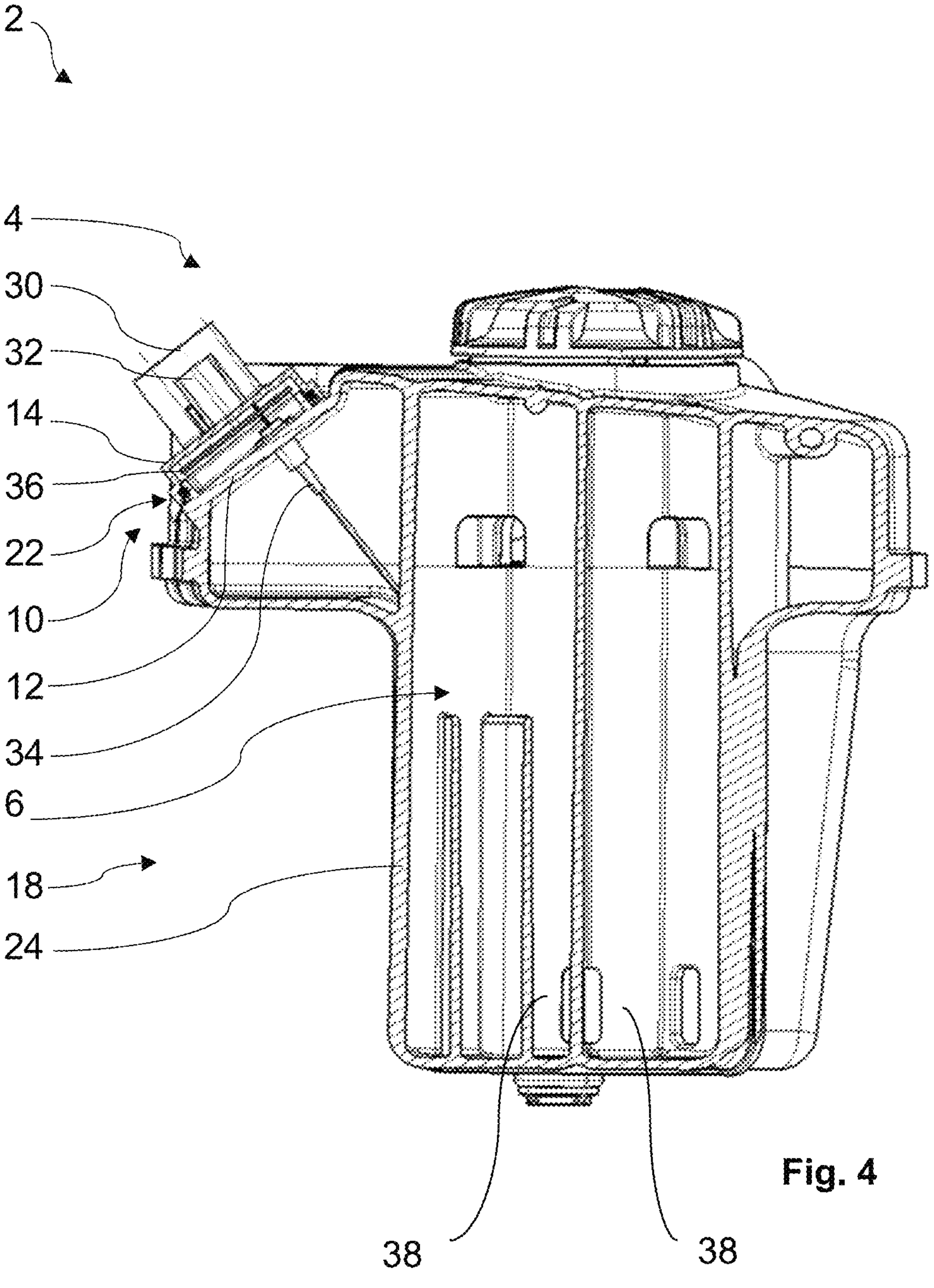
FIG. 4 shows the example from FIG. 2 in a sectional representation from the side.
Figure 5:
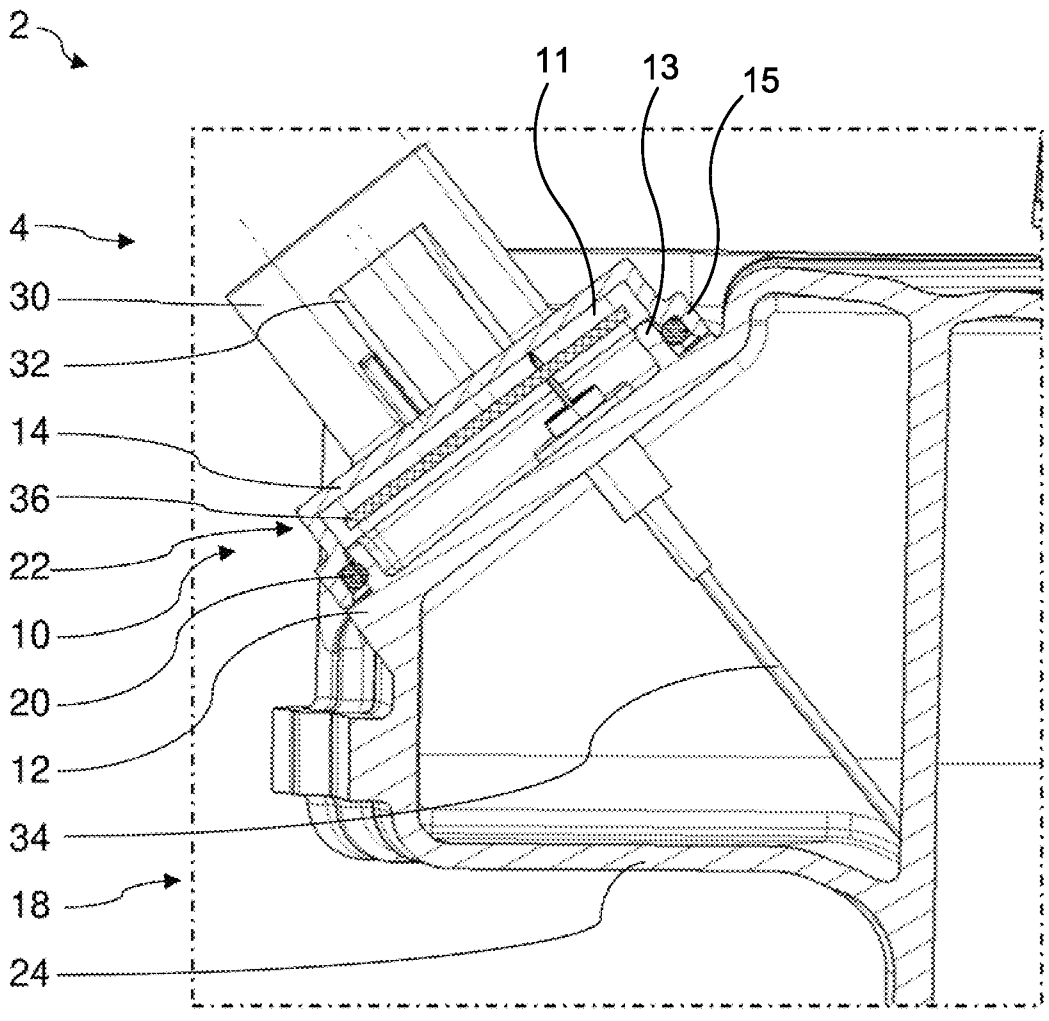
FIG. 5 shows the example from FIG. 4 in an enlarged representation in the region of the electronics housing.
Figure 6:
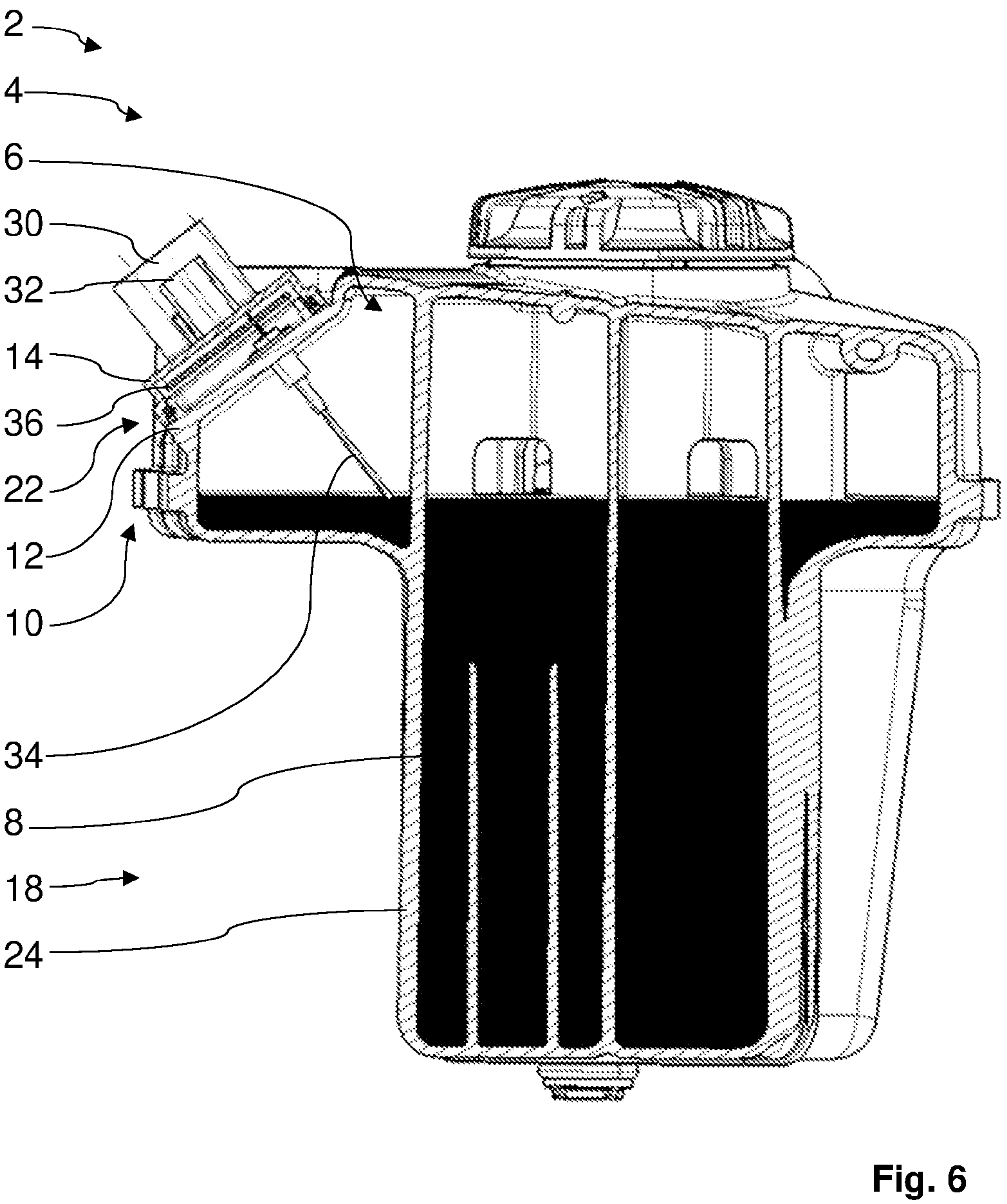
FIG. 6 shows the example from FIG. 4 with coolant located in the interior space of the tank housing.

An example of the coolant conducting system according to the invention of a motor vehicle, which is not shown in detail and is designed as an electric vehicle, is shown strictly by way of example in FIGS. 1 to 6.

The coolant conducting system 2 comprises multiple coolant circuits, and has a coolant tank 4 with an interior space 6 that is configured to store a coolant 8, multiple coolant passages 38 that are configured to deliver the coolant 8 from the coolant tank 4 into at least two coolant circuits, and tank electronics 10 that are configured to control the coolant conducting system 2. The tank electronics 10 are sealed against environmental influences by means of a first electronics housing part 12 and by means of a second electronics housing part 14, designed as an electronics housing cover, of an electronics housing 16.

In the present exemplary embodiment, the coolant tank 4 comprises a tank housing 18 with an outer wall and the interior space 6 that is arranged in the tank housing 18 for storing the coolant 8 for the coolant conducting system 2.

The outer wall is designed according to the invention as the first electronics housing part 12 for the tank electronics 10, wherein the outer wall 12 is designed such that the outer wall 12, in conjunction with the second electronics housing part 14, which is designed as an electronics housing cover, for the tank electronics 10, form a cavity 11 therebetween that indirectly encloses said tank electronics 10 with the use of a seal 20 so as to be sealed against environmental influences. The outer wall 12 has a protruding wall 13 that protrudes therefrom in a direction away from the interior space 6 of the tank housing 18 and that surrounds a portion of the cavity 11. When the second electronics housing part 14 is connected to the first electronics housing part 12. a side wall 15 of the second electronics housing part 14 overlaps with and surrounds an outer periphery of the protruding wall 13, with the seal 20 positioned between the side wall 15 and the protruding wall 13 (see FIG. 5). The first electronics housing part 12 and the second electronics housing part 14 are connected in a manner known per se to the person skilled in the art through insertion of the aforementioned seal 20. Other embodiments of the invention, in which a separate seal is not necessary, are also possible, however. The two electronics housing parts 12, 14 can be screwed, riveted, glued, or welded to one another, for example.

The tank housing 18 is multipart in design here, and has a tank cover, wherein the outer wall designed as the first electronics housing part 12 is designed as the tank cover of the tank housing 18.

The outer wall designed as the first electronics housing part 12 is designed to be inclined in a receptacle area 22 for the tank electronics 10 in such a manner that liquid dripping onto the tank housing 18 from above can run off the aforementioned receptacle area 22 as a result of gravity.

Furthermore, the tank housing 18, namely all parts of the multipart tank housing 18, are each designed as a one-piece plastic part. In addition to the tank cover 12 that is designed as a plastic part and simultaneously is designed as the outer wall and as the first electronics housing part, the tank housing 18 also has a tank body 24 designed as a plastic part, wherein the tank cover 12 and the tank body 24 are connected to one another in a manner known per se to the person skilled in the art, for example by means of plastic welding.

The electronics housing cover 14 is designed in such a manner here that the tank electronics 10 arranged in the electronics housing 16 can be connected in a signal-transmitting manner by means of two connectors 26, 28 to a control unit of the motor vehicle that is at a higher level than the tank electronics 10 and to at least one control valve of the coolant conducting system 2, wherein the electronics housing cover 14 has two connector housings 30, 32 that are each for one of the connectors 26, 28.

In the present exemplary embodiment, the tank electronics 10 arranged in the electronics housing 16 have, in the interior space 6 of the tank housing 18, a signal-transmitting connection that is sealed with respect to the interior space 6 of the tank housing 18, wherein this signal-transmitting connection connects the tank electronics 10 in a signal-transmitting manner to a tank sensor 34 designed as a level sensor, wherein the tank sensor 34 is connected directly to the tank electronics 10 in a signal-transmitting manner. See FIGS. 4 to 6, in particular, in this regard. The level sensor 34 is designed to detect a fill level of the coolant 8 in the interior space 6, and is connected directly to a printed circuit board 36 of the tank electronics 10 in a signal-transmitting manner.

In the present example, the tank electronics 10 are designed and configured in such a manner that all control tasks of the coolant conducting system 2 can be performed entirely by means of these tank electronics 10 as the sole tank electronics 10. Furthermore, the tank electronics 10 are designed and configured in such a manner that a preprocessing of signals present at the tank electronics 10 can be performed by means of the tank electronics 10. For example, analog output signals of the tank sensor 34 that are present at the tank electronics 10 are digitized by means of the tank electronics 10 in order to then be forwarded by the tank electronics 10 as digital signals to the aforementioned control unit of the motor vehicle that is at a higher level than the tank electronics 10.

On account of the design according to the invention of the coolant tank 4, the coolant conducting system 2, and the motor vehicle, the efficiency of the coolant conducting system 2 is maximized with respect to space, materials, manufacturing, and arrangement. For example, it is possible to substantially reduce the number of component parts, the assembly and disassembly effort, the space requirement for the coolant conducting system 2 according to the invention, and finally also the costs and overall weight of the coolant conducting system 2 according to the invention by means of the coolant tank 4 according to the invention. Accordingly, the total weight of the motor vehicle designed as an electric vehicle in the present exemplary embodiment is also reduced. The total weight is a very important quantity, particularly for electric vehicles, especially all-electric vehicles. Furthermore, in the present exemplary embodiment the number of component parts and the number of electrical interfaces are substantially reduced so that the design and manufacture of the overall coolant conducting system 2 is very greatly simplified. This is because additional tank electronics such as control units or the like, and their groups of lines for signal transmission, for example, can be omitted. In addition, different electrical interfaces on and in the tank electronics 10 are combined, for example the interface to the motor vehicle control unit that is at a higher level than the tank electronics 10 and the interface to the tank sensor 34. The tank electronics 10, as the sole tank electronics 10, are alone functionally responsible for signal preprocessing, for example the digitization of analog output signals of the tank sensor 34, and for signal forwarding to the motor vehicle control unit that is at a higher level than the tank electronics 10. There is no need for additional tank electronics that are separate therefrom. For the purpose of producing the aforementioned signal-transmitting connections, therefore, all that is necessary is firstly to connect the connector 26, which is connected in a signal-transmitting manner to the higher-level control unit, to the connector housing 30, and secondly to connect the connector 28, which is connected in a signal-transmitting manner to the at least one control valve, to the connector housing 32. Disconnecting the aforementioned signal-transmitting connections is accomplished analogously.

The invention is not limited to the present example.

The described example serves merely to improve understanding of the structure, the mode of operation, and the characteristics of the invention disclosed here. FIG. 1 to FIG. 6 are schematic, wherein some essential characteristics are depicted on a markedly larger scale in order to illustrate the functions, operating principles, technical embodiments, and features. In this regard, every mode of operation, every principle, every technical embodiment, and every feature that is/are disclosed in FIGS. 1 to 6 or in the text can be combined freely and as desired with all claims, every feature in the text and in the other figures, other modes of operation, principles, technical embodiments, and features that are contained in this disclosure or that follow therefrom, so that all possible combinations shall be attributed to the described invention. This shall also include combinations of all individual statements in the text, which is to say in each paragraph of the description, in the claims, and also combinations of different variants in the text, in the claims, and in FIGS. 1 to 6. Moreover, the claims do not limit the disclosure, and thus the possibilities of combination with one another, of all features discussed. All disclosed features are explicitly also disclosed individually and in combination with all other features here.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A coolant tank for a coolant conducting system of a motor vehicle, the coolant tank comprising:

a tank sensor;

tank electronics;

a seal;

a tank housing with an outer wall and an interior space that is arranged in the tank housing for storing a coolant for the coolant conducting system, the outer wall being a first electronics housing part for the tank electronics; and a second electronics housing part, which is an electronics housing cover for the tank electronics, wherein when the second electronics housing part is connected to the first electronics housing part, the first electronics housing part and the second electronics housing part form a cavity therebetween that encloses the tank electronics so as to be sealed against environmental influences, directly or indirectly via the seal, wherein the first electronics housing part, that is the outer wall of the tank housing, provides a barrier between the tank electronics and the interior space of the tank housing, such that prior to the second electronics housing part being connected to the first electronics housing part, the tank electronics are sealed from the interior space of the tank housing by the first electronics housing part, wherein the tank sensor extends through the outer wall of the tank housing and connects to the tank electronics, such that a first portion of the tank sensor is provided in the cavity formed between the first electronics housing part and the second electronics housing part, and a second portion of the tank sensor is provided in the interior space of the tank housing, and wherein the outer wall of the tank housing has a protruding wall that protrudes therefrom in a direction away from the interior space of the tank housing and that surrounds a portion of the cavity, and wherein when the second electronics housing part is connected to the first electronics housing part, a side wall of the second electronics housing part overlaps with and surrounds an outer periphery of the protruding wall, with the seal being positioned between the side wall of the second electronics housing part and the outer periphery of the protruding wall.

2. The coolant tank according to claim 1, wherein the tank housing is a multipart tank housing that includes a tank cover, and wherein the outer wall that is the first electronics housing part, is the tank cover of the tank housing.

3. The coolant tank according to claim 1, wherein the outer wall, that is the first electronics housing part, is inclined at least in a receptacle area for the tank electronics, such that liquid dripping onto the tank housing from above runs off the aforementioned receptacle area as a result of gravity.

4. The coolant tank according to claim 1, wherein the tank housing is a multipart tank housing, and wherein all parts of the tank housing are each designed as a one-piece plastic part.

5. The coolant tank according to claim 1, wherein the tank electronics include a printed circuit board, and wherein the first portion of the tank sensor is connected directly to the printed circuit board.

6. A coolant conducting system for a motor vehicle with multiple coolant circuits, the system comprising:

a coolant tank; and at least two coolant passages that deliver a coolant from the coolant tank into at least one coolant circuit, wherein the coolant tank comprises:

tank electronics to control the coolant conducting system;

a tank sensor;

a seal;

a tank housing with an outer wall and an interior space that is arranged in the tank housing for storing the coolant for the coolant conducting system, the outer wall being a first electronics housing part for the tank electronics; and a second electronics housing part, which is an electronics housing cover for the tank electronics, wherein when the second electronics housing part is connected to the first electronics housing part, the first electronics housing part and the second electronics housing part form a cavity therebetween that encloses the tank electronics so as to be sealed against environmental influences, directly or indirectly via the seal, wherein the first electronics housing part, that is the outer wall of the tank housing, provides a barrier between the tank electronics and the interior space of the tank housing, such that prior to the second electronics housing part being connected to the first electronics housing part, the tank electronics are sealed from the interior space of the tank housing by the first electronics housing part, wherein the tank sensor extends through the outer wall of the tank housing and connects to the tank electronics, such that a first portion of the tank sensor is provided in the cavity formed between the first electronics housing part and the second electronics housing part, and a second portion of the tank sensor is provided in the interior space of the tank housing, and wherein the outer wall of the tank housing has a protruding wall that protrudes therefrom in a direction away from the interior space of the tank housing and that surrounds a portion of the cavity, and wherein when the second electronics housing part is connected to the first electronics housing part, a side wall of the second electronics housing part overlaps with and surrounds an outer periphery of the protruding wall, with the seal being positioned between the side wall of the second electronics housing part and the outer periphery of the protruding wall.

7. The coolant conducting system according to claim 6, wherein the electronics housing cover is designed such that the tank electronics arranged in the electronics housing are connected in a signal-transmitting manner via at least one connector to a control unit of the motor vehicle or to at least one control valve of the coolant conducting system such that the electronics housing cover has at least one connector housing for the at least one connector.

8. The coolant conducting system according to claim 6, wherein the tank electronics are connected in a signal-transmitting manner to the tank sensor of the coolant conducting system or wherein the tank sensor is connected directly to the tank electronics in a signal-transmitting manner.

9. The coolant conducting system according to claim 6, wherein the tank electronics are designed and configured such that all control tasks of the coolant conducting system are performed entirely via the tank electronics.

10. The coolant conducting system according to claim 6, wherein the tank electronics are designed and configured such that a processing or preprocessing of signals present at the tank electronics are performed by the tank electronics.

11. A motor vehicle comprising:

a coolant conducting system, the coolant conducting system comprising:

a coolant tank; and at least two coolant passages that deliver a coolant from the coolant tank into at least one coolant circuit, wherein the coolant tank comprises:

tank electronics to control the coolant conducting system;

a tank sensor;

a seal;

a tank housing with an outer wall and an interior space that is arranged in the tank housing for storing the coolant for the coolant conducting system, the outer wall being a first electronics housing part for the tank electronics; and a second electronics housing part, which is an electronics housing cover for the tank electronics, wherein when the second electronics housing part is connected to the first electronics housing part, the first electronics housing part and the second electronics housing part form a cavity therebetween that encloses the tank electronics so as to be sealed against environmental influences, directly or indirectly via the seal, wherein the first electronics housing part, that is the outer wall of the tank housing, provides a barrier between the tank electronics and the interior space of the tank housing, such that prior to the second electronics housing part being connected to the first electronics housing part, the tank electronics are sealed from the interior space of the tank housing by the first electronics housing part, wherein the tank sensor extends through the outer wall of the tank housing and connects to the tank electronics, such that a first portion of the tank sensor is provided in the cavity formed between the first electronics housing part and the second electronics housing part, and a second portion of the tank sensor is provided in the interior space of the tank housing, and wherein the outer wall of the tank housing has a protruding wall that protrudes therefrom in a direction away from the interior space of the tank housing and that surrounds a portion of the cavity, and wherein when the second electronics housing part is connected to the first electronics housing part, a side wall of the second electronics housing part overlaps with and surrounds an outer periphery of the protruding wall, with the seal being positioned between the side wall of the second electronics housing part and the outer periphery of the protruding wall.

* * * * *